United States Patent [19]

Lowsky et al.

[11] Patent Number: 4,820,409

[45] Date of Patent: Apr. 11, 1989

[54] PLASTIC PRESSURE RELIEF VALVE ASSEMBLY

[75] Inventors: John Lowsky; Scott Trierwiler; Nicholas Torchia, all of Fayetteville, N.C.

[73] Assignee: Facet Enterprises, Inc., Tulsa, Okla.

[21] Appl. No.: 183,144

[22] Filed: Apr. 19, 1988

[51] Int. Cl.⁴ .............................................. B01D 27/10
[52] U.S. Cl. ..................................... 210/130; 137/854; 210/168; 210/238; 210/440; 210/DIG. 17
[58] Field of Search ................ 137/854; 210/130, 168, 210/232, 238, 440, 450, DIG. 17

[56] References Cited

U.S. PATENT DOCUMENTS

| | | | |
|---|---|---|---|
| 2,439,936 | 4/1948 | Kasten | 210/183 |
| 2,734,636 | 2/1956 | Foster | 210/164 |
| 2,888,141 | 5/1959 | Coates et al. | 210/440 |
| 2,995,249 | 8/1961 | Boewe et al. | 210/130 |
| 3,146,194 | 8/1964 | Hathaway | 210/130 |
| 3,156,259 | 11/1964 | Havelka et al. | |
| 3,187,896 | 6/1965 | Wilkinson | 210/130 |
| 3,221,880 | 12/1965 | Wilkinson | 210/130 |
| 3,231,089 | 1/1966 | Thornton | 210/130 |
| 3,235,085 | 2/1966 | Humbert, Jr. | |
| 3,272,342 | 9/1966 | McLaren et al. | 210/440 |
| 3,305,095 | 2/1967 | Hathaway | |
| 3,315,809 | 4/1967 | Hultgren | 210/130 |
| 3,369,666 | 2/1968 | Hultgren et al. | 210/130 |
| 3,473,664 | 10/1969 | Hulgren | |
| 3,529,722 | 9/1970 | Humbert et al. | |
| 3,567,023 | 3/1971 | Buckman et al. | |
| 3,586,171 | 6/1971 | Offer | 210/136 |
| 3,589,517 | 6/1971 | Palmai | |
| 3,608,724 | 9/1971 | Baldwin | 210/130 |
| 3,618,775 | 11/1971 | Hulgren | 210/130 |
| 3,633,750 | 1/1972 | Braun et al. | 210/130 |
| 3,640,390 | 2/1972 | Goy et al. | 210/130 |
| 3,669,144 | 6/1972 | Palmai | |
| 3,695,437 | 10/1972 | Shaltis | 210/136 |
| 3,724,665 | 4/1973 | Hall | 210/130 |
| 3,855,128 | 12/1974 | Shaltz et al. | 210/130 |
| 3,928,201 | 12/1975 | Junck et al. | 210/132 |
| 3,957,640 | 5/1976 | Stack | |
| 4,028,243 | 6/1977 | Offer et al. | |
| 4,035,306 | 7/1977 | Maddocks | |
| 4,045,349 | 8/1977 | Humbert, Jr. | 210/232 |
| 4,084,606 | 4/1978 | Mittleman | 137/854 X |
| 4,144,168 | 3/1979 | Thornton | 210/130 |
| 4,497,706 | 2/1985 | Pickett et al. | |
| 4,696,322 | 9/1987 | Knapp et al. | 137/854 X |
| 4,764,275 | 8/1988 | Robichaud | 210/232 |

FOREIGN PATENT DOCUMENTS 1075167  4/1980  Canada .
982466   2/1965  United Kingdom .

*Primary Examiner*—Charles Hart
*Attorney, Agent, or Firm*—Staas & Halsey

[57] ABSTRACT

A plastic relief valve assembly is provided having a one-piece valve body, with a sleeve portion and a slotted portion, and a valve. The slotted portion includes a plurality of radially disposed inlets. The valve includes an axial portion and a radial portion. The radial portion extends angularly over the radial inlets in a seated position and the axial portion extends into the valve body for quick connection therewith by a groove and rib combination provided on the valve and valve body, respectively. The radial portion of the plastic valve is flexible, and the valve opens when fluid pressure reaches a predetermined level. A plastic antidrain valve is also connected to the valve body. A fluid filter incorporating the combined plastic relief valve assembly/antidrain back valve is also provided.

23 Claims, 3 Drawing Sheets

PLASTIC PRESSURE RELIEF VALVE ASSEMBLY

BACKGROUND OF THE INVENTION

This invention relates to fluid filters and, more particularly, to improved pressure relief valve assemblies and antidrain back (ADB) valves for spin-on, disposable, oil filters.

Spin-on, disposable, oil filters are used with internal combustion engines to filter out small particulate matter which would otherwise abrade moving engine parts. After a recommended time interval, the old filter is replaced with a new filter and is therefore considered disposable.

Such a filter has an outer casing, a filter element disposed within the casing, an end member fixed at one end of the casing, a pressure relief valve assembly, which allows by-pass of the filter element, when desired, and an ADB valve. Plural inlet ports and a central outlet port are provided in the end member to allow oil to circulate through the filter element. The central outlet port is usually threaded for "spin-on" mounting of the filter to an engine.

Conventional pressure relief valve assemblies are known to be of the metal or plastic types.

More particularly, as described in U.S. Pat. No. 3,473,664, issued to HULTGREN, and shown in FIG. 1 herein, a known metal pressure relief valve assembly 10 includes an upper housing 12, against which a filter element 14 usually abuts, and a lower housing 16. The lower housing 16 includes oil inlet holes 18. The upper housing 12 retains a compression spring 20 which urges an elastic piston 22 downwardly via a metal piston support 24 into a seated position over the inlet holes 18 formed in the lower housing 16. The metal piston support 24 includes an upright annular flange 25 which receives radially outward the compression spring 20.

When, e.g., the filter element 14 is full of contaminants, oil pressure at the oil inlet holes 18 increases and exerts an upward force which overcomes the force on the piston 22 and piston support 24 exerted by the compression spring 20. If a pressure threshold is surpassed, the piston 22 is unseated, thereby enabling oil to by-pass the filter element 14 and leave the oil filter 26 through the center tube 28 and a central outlet 30.

It is known that these metal pressure relief valves suffer from several drawbacks. First, a high degree of dimensional variability is necessitated by the numerous parts, which leads to exceeding desired relief valve opening pressures. Second, relatively high production costs result due to the number of parts, the cost of metal and the need to fixedly connect the upper and lower housings by automation while they are under spring pressure. Finally, sealing reliability over time is less than desired.

Plastic pressure relief valve assemblies are also known. A typical plastic assembly is described in U.S. Pat. No. 3,156,259, issued to HAVELKA et al. and shown in FIG. 2 herein. The assembly 48 is shown including a metal valve plate 50 which is urged into a seated position against a flanged portion 52 of a valve body 54 by means of a compression spring 56. The spring 56 is disposed between the valve plate 50 and hooked extensions 57, 58 which are integrally formed with the valve body 54. The flanged portion 52 is also integrally formed or molded of plastic material with the valve body 54. The valve plate 50 is essentially an annular planar member having an inner, upstanding flange portion 59 which receives radially outward the compression spring 56.

Although HAVELKA et al. suggests the need for only a metal valve plate 50, the HAVELKA et al. plastic relief valve requires, in practice, both a rubber piston and a metal piston support as evidenced by subsequent U.S. Pat. Nos. 3,589,517, issued to PALMAI and 4,028,243, issued to OFFER, which incorporate the HAVELKA et al. valve design along with a rubber piston. Of course, requiring both a piston and piston support increases raw mterial and assembly costs. Further, these plastic relief valves, like the metal valves discussed above, require a compression spring which must be assembled on the valve body.

Further, each of the two prior art types of pressure relief valve assemblies described above requires a separate means for retaining a coil spring, uses a spring urging both a piston and piston support into sealing relation and is susceptible to seal deterioration during operation.

Of related interest is U.S. Pat. No. 3,231,089 showing a one-piece, molded rubber, combined pressure relief-/ADB valve. U.S. Pat. No. 4,045,349 also shows a combined pressure relief/ADB valve structure.

Overall, it is desirous that a pressure relief valve assembly be capable of the lowest cost manufacture and be capable of efficient sealing properties. For example, a design which eliminates the need for a separate compression spring or retainer therefore is desired. In addition, having flexibility in choosing the materials and structural design of the assembly is preferred to being limited to a particular type and configuration. Finally, it is desirous that a valve be capable of relatively quick and easy automated assembly requiring no welding, brazing, or soldering.

As noted above, filters also include ADB valves. An ADB valve prevents gravity induced draining of the filter which would otherwise occur when the engine is not operating. This is a desirable feature since a drained oil filter would otherwise momentarily interrupt circulation of oil when the engine resumes operation.

Again referring to FIG. 1, a conventional ADB valve 38 includes a rubbery, annular flap 40 and a corresponding metal spring 42 which overlie the plural inlet ports 44 of an end member 46. The ADB valve 38 opens in the direction of arrows "A" in response to oil flowing into the filter 26 through the inlet ports 44. When oil flow ceases by virtue of the engine shutting down, the ADB valve 38 returns to its normal seated position against the end member 46 to prevent oil within the filter 26 from draining out through the inlet ports 44.

As described above, ADB valves conventionally include two components which must be separately formed and assembled in the filter. It is always desired, if possible, to minimize component part assembly steps and overall production costs and time. As a result, a simpler ADB valve is desired.

Although the relevant art described above eliminates some of the problems inherent in the oil filter art, a need exists for a pressure relief valve assembly, an ADB valve and an oil filter incorporating same that is more consistent in operation and cost effective to produce.

SUMMARY OF THE INVENTION

Accordingly, it is an object of the present invention to provide a pressure relief valve assembly having improved sealing and relief capability and being easier and more economical to manufacture and assemble.

It is another object of the present invention to provide a pressure relief valve assembly having as few components as possible.

It is another object of the present invention to provide a pressure relief valve assembly entirely made of plastic.

It is another object of the present invention to provide a plastic pressure relief valve assembly having improved sealing characteristics.

It is another object of the present invention to provide a plastic pressure relief valve assembly capable of maintaining structural integrity throughout filter operation pressure and temperature cycles.

It is another object of the present invention to provide a pressure relief valve assembly which is capable of opening at a predetermined valve opening pressure with little or no variation.

It is another object of the present invention to provide a combined plastic pressure relief valve assembly/ADB valve which is easier to manufacture and assemble than conventional components.

It is another object of the present invention to provide a combined plastic pressure relief valve assembly/ADB valve which can be automatically assembled by a press fit.

It is another object of the present invention to provide a combined plastic pressure relief valve assembly/ADB valve which requires the least amount of space in the filter upon assembly.

To achieve the foregoing and other objects of the present invention and in accordance with the purposes of the invention there is provided a plastic pressure relief valve assembly for a fluid filter, including: a valve body having a sleeve portion defining a central outlet and a slotted portion formed on the sleeve portion including plural radial inlets; and a valve connected to the valve body and having an axial portion and a radial portion, the radial portion normally being in a seated position over the radial inlets and being flexible away from the seated position to an unseated position in response to fluid flowing through the radial inlets at a predetermined pressure. Preferably, the valve body and the valve are injection molded of a suitable plastic. Finally, an injection molded plastic flap is associated with the pressure relief valve assembly and acts as an ADB valve. The valve and flap can be separately injection molded and press fit onto the valve body or can be formed integrally therewith.

Other features and advantages of the present invention will be apparent from the following description taken in conjunction with the accompanying drawings, in which like reference numerals designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Figure 1:
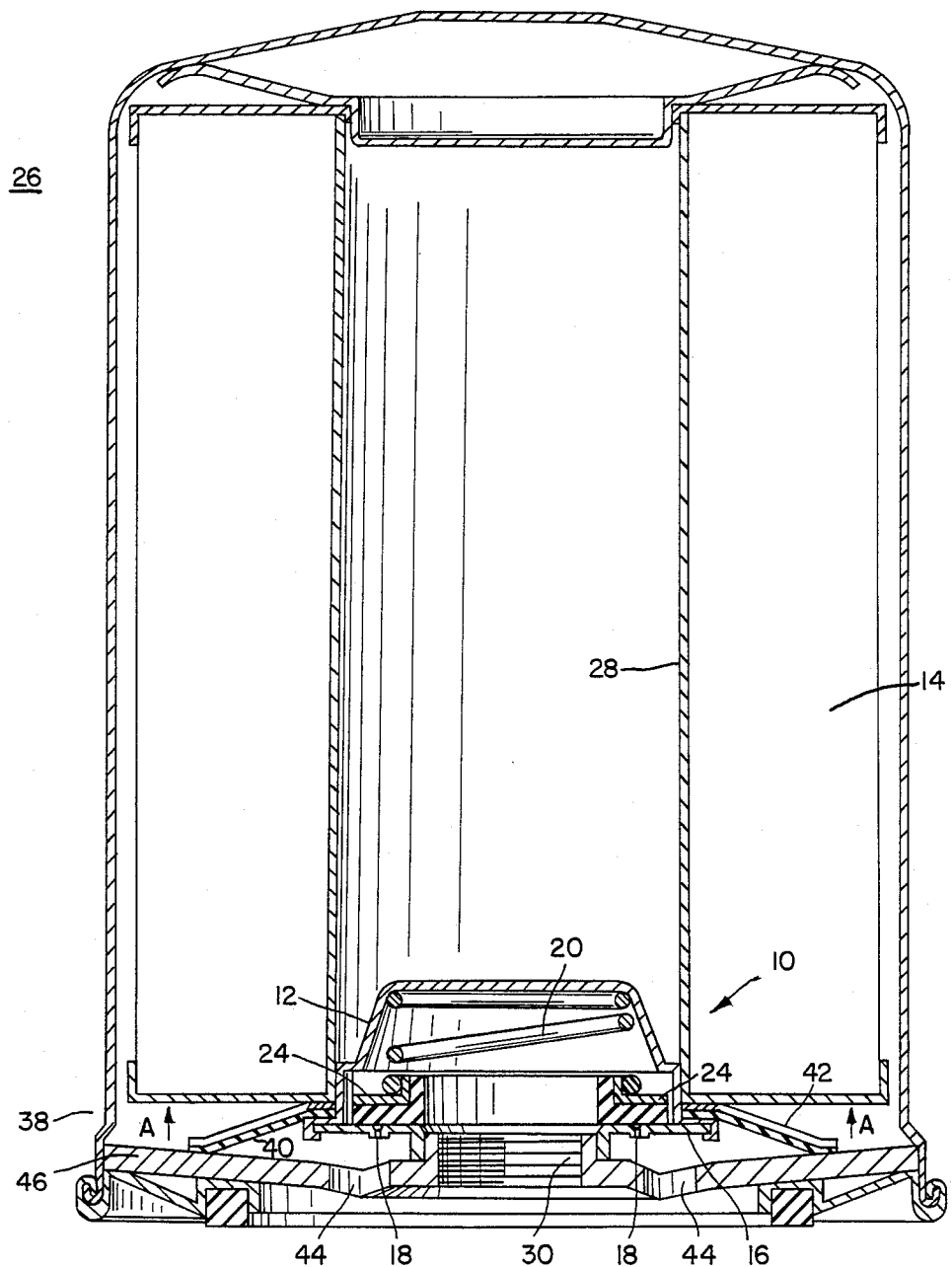
FIG. 1 is a side, cross-sectional view of a known fluid filter incorporating a metal pressure relief valve assembly and ADB valve.
Figure 2:
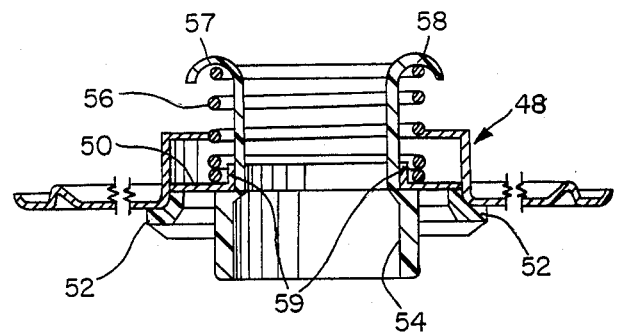
FIG. 2 is a cross-sectional view of a plastic pressure relief valve.

The preferred embodiments of the present invention will now be described with reference to FIGS. 3-7.

The pressure relief valve assembly according to the present invention is shown in FIGS. 3-6 and is indicated generally by reference numeral 60. The assembly 60 includes a valve body 62 having a sleeve portion 64 and a slotted portion 66, and a valve 90.

The assembly 60 is made of a plastic material, preferably a nylon. Other plastics can be used as long as they are able to withstand the repeated temperature and pressure cycles of a fluid filter.

The sleeve portion 64 defines a central outlet 68 and includes an inner cylindrical surface 70 extending between a first end 72 and a second end 74 of the sleeve portion 64.

Figure 5:
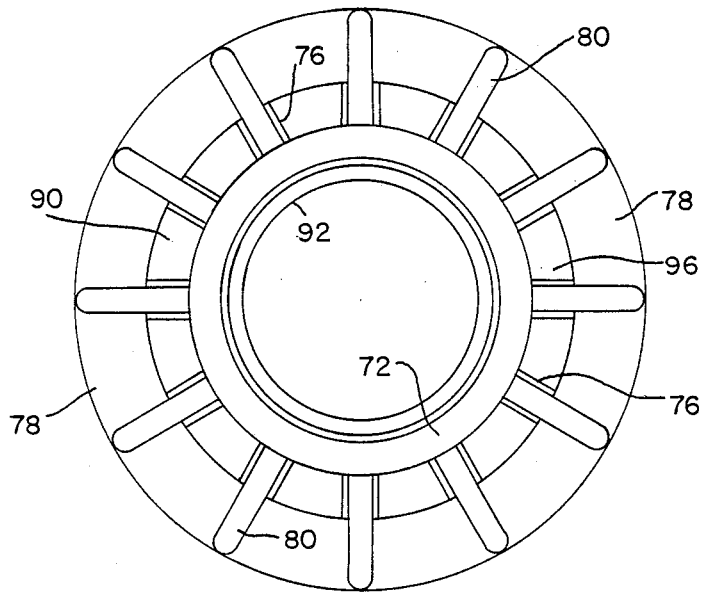
FIG. 5 is a bottom view of the assembly.

As best seen in FIG. 5 the slotted portion 66 includes a plurality of radial inlets 76. The inlets 76 are bordered radially outwardly by a flanged area 78. Further, between adjacent inlets 76 there is formed a rib 80 which lends strength to the assembly 60.

Figure 3:
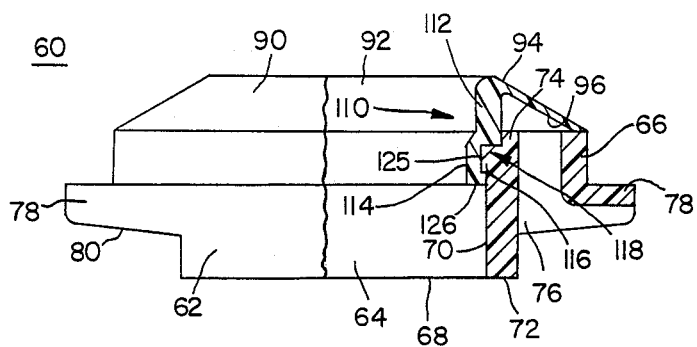
FIG. 3 is a side, partial, cross-sectional view of the plastic pressure relief valve assembly according to the present invention in the "seated" position.
Figure 4:
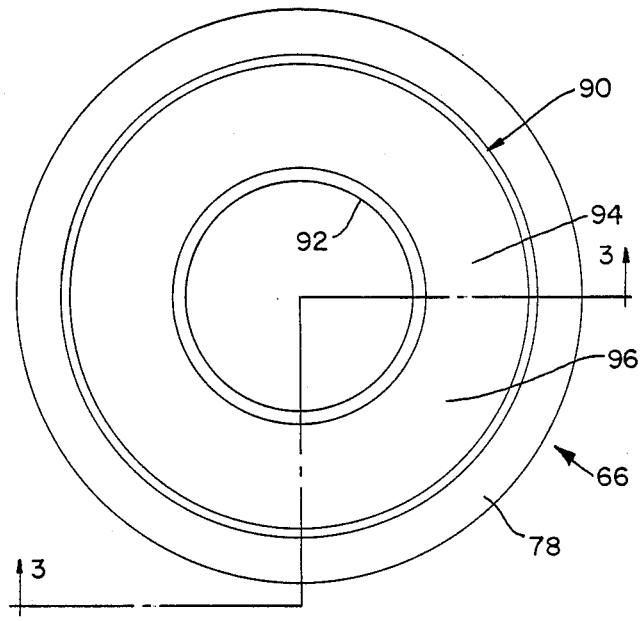
FIG. 4 is a top view of the assembly.

The valve 90 has an axial portion 92 and a radial portion 94 formed integrally therewith. The valve 90 is also made of the plastic so that the radial portion 94 is able to flex or bend to provide a spring force. Normally, the radial portion 94 is in a "seated" position over the radial inlets 76, as illustrated in FIG. 3.

More particularly, the radial portion 94 is angularly disposed over the radial inlets 76 in a direction opposed to the direction of fluid flow through the radial inlets 76. The angle of the radial portion 94 with respect to the axial portion 92 is preferably less than 90°. This acute angular disposition increases the force required to deflect the radial portion 94 upwardly to an "unseated" position. The thickness and composition of the molded plastic radial portion 94 can be precisely chosen to provide a yielding flex at a particular, desired pressure, such as 10 p.s.i. po Again referring to FIG. 3, the relief valve assembly 60 also includes means 110 for connecting the valve 90 to the valve body 62. This connecting means 110 assures a speedy and sure connection of the valve assembly components during manufacture. The connecting means 110 can be an interference fit engaged by push fitting cooperative or complementary components associated with the valve 90 and valve body 62. More particularly, the axial portion 92 of the valve 90 has an upstanding cylindrical portion 112 which extends upwardly adjacent the second end 74 of the sleeve portion, and offset portion 114 which extends into the sleeve portion 64. An annular, substantially rectangular groove 116 is formed on the outer wall of the offset portion 114. A complementary annular rectangular rib 118 is formed on the inner cylindrical surface 70 near the second end 74 of the sleeve portion 64. The groove 116 and rib 118 form the interference fit to interconnect the valve 90 and valve body 62.

The lower, outside corner of the offset portion 114 is provided with a beveled outer edge 126. The top, inner corner of the rib 118 is also provided with a bevelled edge 125 in order to facilitate connection by push-fit of the valve 90 into the valve body 62.

Figure 6:
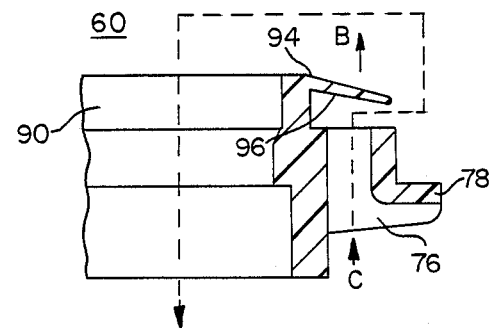
FIG. 6 is a side, partial cross-sectional view of the assembly in the "unseated" position.

The present invention also contemplates formation of the valve body 62 and valve 90 as one-piece by injection molding, as shown in FIG. 6.

With further reference to FIG. 6, abnormal pressure can build up at the radial inlets 76, pushing against the inner surface 96 of the radial portion 94. At a predetermined fluid pressure, the radial portion 94 deflects upwardly relative to the valve body 62 to an "unseated" position as shown by arrow "B", thereby allowing fluid to pass through the relief valve 60 and bypass the filter element as shown by arrow "C".

The above-described plastic, pressure relief valve assembly 60 can be incorporated in a conventional filter such as shown in FIG. 1 herein and described above. The invention may also be incorporated in the filter described in Applicants' co-pending application Ser. Nos. 791,353 now U.S. Pat. No. 4,764,275, entitled FLUID FILTER AND METHOD FOR ATTACHING SAME IN SEALING RELATION TO A FILTER MOUNT and 205,632, , entitled PLASTIC FLUID FILTER AND METHOD OF MANUFACTURING SAME. These applications are incorporated by reference herein.

Figure 7:
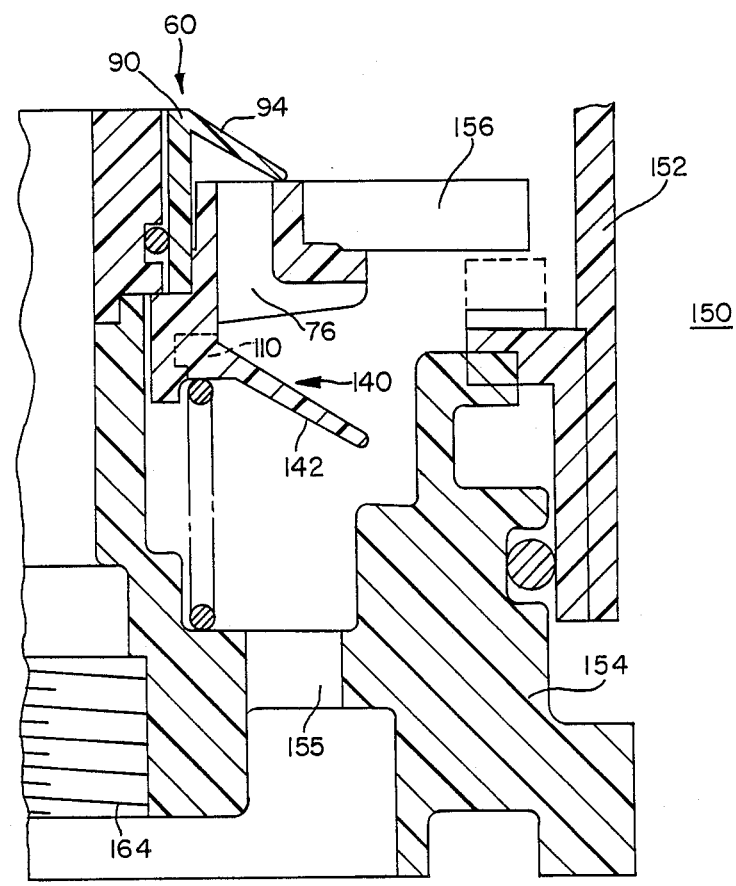
FIG. 7 is a side, partial, cross-sectional view of a fluid filter according to the present invention, illustrating particularly a combined pressure relief valve assembly/ADB valve therein.

More particularly, as shown in FIG. 7 herein, a filter 150 is shown incorporating the plastic pressure relief valve assembly 60 described above. The fluid filter 150 includes a plastic casing 152 and a plastic, screw threaded, end member or adaptor 154 fitted into an open end of the casing 152 by a bayonet-type attachment (the end member 154 is shown just before spring biased, bayonet attachment). The casing 152 and end member 154 form a pressure vessel in which oil is filtered through the filter element 156. The relief valve assembly 60 is shown in the normal, "seated," non-bypass position.

The present invention is also directed to a new ADB valve 140 made of, e.g., nylon or a thermoplastic rubber. As also shown in FIG. 7, the ADB valve 140 is in the form of a single, radial flap 142 which may be connected to the first end 72 of the sleeve portion 64 by an interference fit, such as the connecting means 110 described above (shown in phantom lines in FIG. 7). Alternatively, the flap 142 may be integrally formed with the valve body 62, as shown in FIG. 7, by injection molding. The ADB valve 140 overlies fluid inlets 155 formed in the end member 154 when the assembly 60 is connected to the end member 154 of the filter 150. During operation, oil flows past the ADB valve 140 and into the filter element 156.

In the event of filter element 156 blockage, pressure increases at the inner surface 96 of the valve 90 until a predetermined value is reached. At that point, the valve 90 unseats as shown in FIG. 6, and oil is allowed to flow through the fluid inlets 155, through the radial inlets 76 of the valve body 62, into the center tube 162 and out the central outlet 164, thereby bypassing the filter element 156.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A pressure relief valve assembly for a fluid filter, comprising:
   (a) a valve body having
      (i) a sleeve portion including a central outlet, and
      (ii) a slotted portion formed on the sleeve portion and including plural radial inlets, and
   (b) a valve having
      (i) an axial portion, and
      (ii) a radial portion normally in a seated position over the radial inlets and being flexible away from the seated position to a non-seated position in response to fluid flowing through the radial inlets at a predetermined pressure.

2. The assembly as recited in claim 1, wherein the valve body and the valve are integrally molded as a one piece plastic member.

3. The assembly as recited in claim 1, wherein the valve body is separately molded from plastic material.

4. The assembly as recited in claim 3, wherein the valve is separately molded from plastic material.

5. The assembly as recited in claim 4, further comprising means for connecting the valve body and the valve.

6. The assembly as recited in claim 5, wherein the connecting means comprises an interference fit.

7. The assembly as recited in claim 6, wherein the interference fit comprises an annular rib formed on an inner cylindrical surface of the sleeve portion and a complementary annular groove formed in the axial portion of the valve.

8. The assembly as recited in claim 7, wherein an edge of the rib and an edge of the axial portion of the valve are bevelled to facilitate connection.

9. The assembly as recited in claim 1, wherein the radial portion of the valve is acutely angled relative to the axial portion of the valve.

10. The assembly as recited in claim 1, further comprising an antidrain back valve integrally formed of the sleeve portion of the valve body.

11. The assembly as recited in claim 1, further comprising a separate antidrain back valve attached to the sleeve portion by connecting means.

12. A fluid filter, comprising:
   (a) a casing having a closed end and an open end;
   (b) an end member connected to the casing at the open end thereof and having a central fluid outlet and plural fluid inlets disposed around the central outlet;
   (c) a pressure relief valve assembly, including:
      (i) a valve body having a sleeve portion including a central outlet, and a slotted portion formed on the sleeve portion and including plural radial inlets, and
      (ii) a valve having an axial portion, and a radial portion normally in a seated position over the radial inlets and being flexible away from the seated position to a non-seated position in response to fluid flowing through the radial inlets at a predetermined pressure.

13. The filter as recited in claim 1, wherein the valve body and the valve are integrally molded as a one piece plastic member.

14. The filter as recited in claim 12, wherein the valve body is separately molded from plastic material.

15. The filter as recited in claim 14, wherein the valve is separately molded from plastic material.

16. The filter as recited in claim 12, further comprising:
   means for connecting the valve body and the valve.

17. The assembly as recited in claim 16, wherein the connecting means comprises an interference fit.

18. The filter as recited in claim 17, wherein the interference fit comprises an annular rib formed on an inner cylindrical surface of the sleeve portion and a complementary annular groove formed in the axial portion of the valve.

19. The filter as recited in claim 18, wherein an edge of the rib and an edge of the axial portion of the valve are bevelled to facilitate connection.

20. The filter as recited in claim 12, wherein the radial portion of the valve is acutely angled relative to the axial portion of the valve.

21. The filter as recited in claim 12, further comprising an antidrain back valve integrally formed of the sleeve portion of the valve body.

22. The filter as recited in claim 12, further comprising a separate antidrain back valve connected to the valve body by connecting means.

23. A fluid filter, comprising:
   (a) a plastic casing having a closed end and an open end;
   (b) a plastic end member connected to the casing at the open end thereof and having a central fluid outlet and plural fluid inlets disposed around the central outlet;
   (c) a plastic pressure relief valve assembly, including:
      (i) a valve body having a sleeve portion including a central outlet, and a slotted portion formed on the sleeve portion and including plural radial inlets, and
      (ii) a valve having an axial portion, and a radial portion normally in a seated position over the radial inlets and being flexible away from the seated position to a non-seated position in response to fluid flowing through the radial inlets at a predetermined pressure, and
   (d) a plastic antidrain back valve on the valve body.

* * * * *